(12) United States Patent
Mavlankar (10) Patent No.: US 11,481,541 B2
(45) Date of Patent: Oct. 25, 2022

(54) TECHNIQUES FOR COMPARING THE COMPRESSION EFFICIENCY OF ENCODING CONFIGURATIONS

(71) Applicant: NETFLIX, INC., Los Gatos, CA (US)

(72) Inventor: Aditya Mavlankar, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/737,654

(22) Filed: Jan. 8, 2020

(65) Prior Publication Data

US 2021/0176460 A1 Jun. 10, 2021

Related U.S. Application Data

(60) Provisional application No. 62/944,327, filed on Dec. 5, 2019.

(51) Int. Cl.
*H04N 19/154* (2014.01)
*G06F 40/146* (2020.01)
*G06T 7/00* (2017.01)
*H04N 19/103* (2014.01)

(52) U.S. Cl.
CPC .......... *G06F 40/146* (2020.01); *G06T 7/0002* (2013.01); *H04N 19/103* (2014.11); *H04N 19/154* (2014.11); *G06T 2207/30168* (2013.01); *G06T 2207/30176* (2013.01)

(58) Field of Classification Search
CPC ............................ H04N 19/103; H04N 19/154
See application file for complete search history.

(56) References Cited

U.S. PATENT DOCUMENTS

| | | | |
|---|---|---|---|
| 2008/0196076 A1 | 8/2008 | Shatz et al. | |
| 2012/0002716 A1* | 1/2012 | Antonellis | H04N 19/40 |
| | | | 375/E7.076 |
| 2012/0201476 A1 | 8/2012 | Carmel et al. | |
| 2016/0098852 A1 | 4/2016 | Senda et al. | |
| 2018/0063536 A1* | 3/2018 | Carmel | H04N 19/154 |

(Continued)

OTHER PUBLICATIONS

Zhi Li et al., "Toward A Practical Perceptual Video Quality Metric", Netflix Technology Blog, Jun. 6, 2016.

(Continued)

*Primary Examiner* — Hesham K Abouzahra
(74) *Attorney, Agent, or Firm* — Artegis Law Group, LLP (57) ABSTRACT

In various embodiments, a codec comparison application independently encodes each source image included in a set of source images using a first encoding configuration to generate a first set of encoded images. The codec comparison application also independently encodes each source image included in the set of source images using a second encoding configuration to generate a second set of encoded images. For each encoded image in the first set of encoded images and each encoded image in the second set of encoded images, a visual quality score for a reconstructed source image derived from the encoded image falls within a tolerance of a target visual quality score. Subsequently, the codec comparison application computes a bitrate change based on a first total file size for the first set of encoded image and a second total file size for the second set of encoded images

20 Claims, 5 Drawing Sheets

(56) References Cited

U.S. PATENT DOCUMENTS

2020/0145661 A1   5/2020   Jeon et al.

OTHER PUBLICATIONS

Zeina Sinno et al., "Quality Measurement of Images on Mobile Streaming Interfaces Deployed at Scale", IEEE Transactions on Image Processing, vol. 29, Sep. 11, 2019.
Jan Ozer et al., "Compute Your Own Bjontegaard Functions (BD-Rate)", May 30, 2018.
Non-Final Office Action received for U.S. Appl. No. 16/737,645 dated Feb. 19, 2021, 27 pages.
International Search Report for application No. PCT/US2020/062606 dated Mar. 2, 2021.
Kam et al., "Convergence of an Iterative Design Algorithm for JPEG Quantization Tables", Proceedings of the International Conference on Image Processing, XP010196953, DOI: 10.1109/ICIP.1995.538541, ISBN: 978-0-7803-3122-8, vol. 2, Oct. 23-26, 1995, pp. 81-84.
Final Office Action received for U.S. Appl. No. 16/737,645 dated Sep. 3, 2021, 36 pages.
Notice of Allowance received for U.S. Appl. No. 16/737,645 dated Jan. 26, 2022, 12 pages.

\* cited by examiner

TECHNIQUES FOR COMPARING THE COMPRESSION EFFICIENCY OF ENCODING CONFIGURATIONS

CROSS-REFERENCE TO RELATED APPLICATIONS

This application claims priority benefit of the United States Provisional Patent Application titled, "TECHNIQUES FOR COMPRESSING IMAGES TO ACHIEVE A TARGET QUALITY LEVEL," filed on Dec. 5, 2019 and having Ser. No. 62/944,327. The subject matter of this related application is hereby incorporated herein by reference.

BACKGROUND

Field of the Various Embodiments

The various embodiments relate generally to computer science and image processing and, more specifically, to techniques for comparing the compression efficiency of encoding configurations.

Description of the Related Art

To reduce the time required to load web pages onto endpoint devices, encoding processes are used to remove selected information from the source images that are ultimately displayed on the web pages. Relative to the source images, the encoded images contain less content and, therefore, can be transmitted from a website server to a web browser application using less bandwidth, which increases download speed. As the web browser application loads the web page that ultimately displays one or more of the source images, the web browser application executes a decoding process on the encoded versions of the source images. The decoding process generates reconstructed versions of the source images. However, because the encoded versions of the source images do not include all of the information from the source images, the reconstructed versions of the source images represent only approximations of the original source images. As a result, the visual quality of the reconstructed versions of the source images can suffer relative to the visual quality of the original source images.

In general, the visual quality of each reconstructed version of a source image results from one or more tradeoffs between file size and visual quality level that are implemented by the encoding process. Thus, implementing an encoding process that optimizes the tradeoffs between file size and visual quality level is desirable. In one approach to encoding source images, a developer selects a target file size that controls the number of bits used to encode each source image or an encoding parameter value that controls the amount of compression that is performed on each source image. The developer then configures an encoder via the selected target file size or encoding parameter value and executes the encoder on each source image to generate an encoded version of the source image.

One drawback of the above approach of using the same encoder configuration to encode multiple source images is that variations in the complexity of the source images may result in subpar tradeoffs between file size and visual quality level for some of the source images. In that regard, relatively complex source images could be encoded using fewer bits than are necessary to achieve an acceptable level of visual quality. Conversely, relatively simple source images could be encoded using more bits than are necessary to achieve a particular level of visual quality. For example, a relatively simple source image could have the same level of visual quality regardless of whether that source image were encoded using 10 kilobytes ("KB") or 6 KB. If the encoder were to use 10 KB to encode the source image, then 4 KB would be unnecessarily wasted. This type of encoding inefficiency not only wastes storage resources on machines, such as website servers, but also increases the bandwidth required to transmit the encoded versions of source images to web browser applications. Thus, these types of encoding inefficiencies can increase the time required to load the web pages that display the reconstructed versions of source images.

As the foregoing illustrates, what is needed in the art are more effective techniques for encoding images.

SUMMARY

One embodiment of the present invention sets forth a computer-implemented method for analyzing encoding configurations. The method includes, for each source image included in a plurality of source images, encoding the source image using a first encoding configuration to generate an encoded image, where the encoded image is included in a first plurality of encoded images, and where a visual quality score for a reconstructed source image derived from the encoded image falls within a tolerance of a target visual quality score; for each source image included in the plurality of source images, encoding the source image using a second encoding configuration to generate an encoded image, wherein the encoded image is included in a second plurality of encoded images, and where a visual quality score for a reconstructed source image derived from the encoded image falls within a tolerance of a target visual quality score; computing a first total file size for the first plurality of encoded images and a second total file size for the second plurality of encoded images; and computing a bitrate change based on the first total file size and the second total file size.

At least one technical advantage of the disclosed techniques relative to the prior art is that, with the disclosed techniques, the number of bits used to encode each source image is individually optimized to achieve a target quality level. In particular, relatively complex source images are encoded using enough bits to ensure that the target quality level is met when displaying reconstructed images derived from the encoded images. Further, with the disclosed techniques, the number of bits unnecessarily wasted when encoding relatively simple source images can be reduced relative to prior art approaches that use a single target file size or a single encoding parameter value for multiple source images. As a result, both the storage resources required to store the resulting encoded images on a website server and the bandwidth required to transmit the encoded source images to web browser applications can be reduced. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

In the following description, numerous specific details are set forth to provide a more thorough understanding of the various embodiments. However, it will be apparent to one skilled in the art that the inventive concepts may be practiced without one or more of these specific details.

A typical media service provider enables customers to access titles in a media library via web pages that display source images known as thumbnails, where each thumbnail is a placeholder for a different title. To reduce the time required to load web pages onto endpoint devices, encoding processes are used to remove selected information from the source images. To display the source images via web pages, a web browser application executes a decoding process on the encoded versions of the source images to reconstruct the source images. However, because the encoded versions of the source images do not include all of the information from the source images, the visual quality of the reconstructed versions of the source images can suffer relative to the visual quality of the original source images.

In general, the visual quality of each reconstructed version of a source image results from one or more tradeoffs between file size and visual quality level that are implemented by the encoding process. Thus, implementing an encoding process that optimizes the tradeoffs between file size and visual quality level is desirable. In one approach to encoding source images, a developer selects a target file size that controls the number of bits used to encode the source images or an encoding parameter value that controls the amount of compression that is performed on the source images. The developer then configures an encoder via the selected target file size or encoding parameter value and executes the encoder on each of the source images to generate an encoded version of the source image.

One drawback of using the same encoder configuration to encode multiple source images is that variations in the complexity of the source images may result in subpar tradeoffs between file size and visual quality level for some of the source images. In that regard, relatively complex source images could be encoded using fewer bits than are necessary to achieve an acceptable level of visual quality. Conversely, relatively simple source images could be encoded using more bits than are necessary to achieve a particular level of visual quality. This type of encoding inefficiency not only wastes storage resources on machines, such as website servers, but also increases the bandwidth required to transmit the encoded versions of source images to web browser applications.

With the disclosed techniques, however, an image encoding application executes a binary search to generate an optimized encoded image for a source image based on a target quality score. The target quality score is a value for a quality metric that is monotonic with respect to an encoding parameter. In one embodiment, the image encoding application initializes a search interval to include all of the valid values for the encoding parameter. For each iteration, the image encoding application sets the parameter value of the encoding parameter equal to the mid-point of the search interval. The image encoding application then configures an encoder included in a coder/encoder ("codec") to encode the source image at the parameter value, thereby generating an encoded image. Subsequently, the image encoding application configures a decoder included in the codec to decode the encoded image. The image encoding application determines a quality score for the resulting reconstructed image. If the quality score does not fall within a specified tolerance of the target quality score, then the image encoding application eliminates half of the search interval based on the quality score and the target quality score and executes a new iteration. Otherwise, the image encoding application saves the encoded image as the optimized encoded image.

In one embodiment, a codec comparison application uses the image encoding application to compare the compression efficiency of two codecs at the target quality score. For a set of source images, the codec comparison application configures the image encoding application to generate a first set of optimized encoded images that achieve the target quality using the first codec and a second set of optimized encoded images that achieve the target quality score using the second codec. The codec comparison application then computes a bitrate change based on the total file size of the first set of optimized encoded images and the total file size of the second set of optimized encoded images. The bitrate change specifies the bitrate increase or bitrate decrease associated with encoding the set of source images to generate a set of encoded source images that each achieve the target quality score using the second codec instead of the first codec.

At least one technical advantage of the disclosed techniques relative to the prior art is that, with the disclosed techniques, the image encoding application individually optimizes the number of bits used to encode each source image to achieve a target quality score. In that regard, unlike prior art approaches that use a single target file size or a single encoding parameter value for multiple source images, the image encoding application ensures that each optimized encoded image achieves the target quality level without unnecessarily wasting bits. As a result, both the storage resources required to store the resulting encoded images on a website server and the time required to load web pages that display the source images can be reduced. These technical advantages provide one or more technological advancements over prior art approaches.

System Overview

Figure 1:
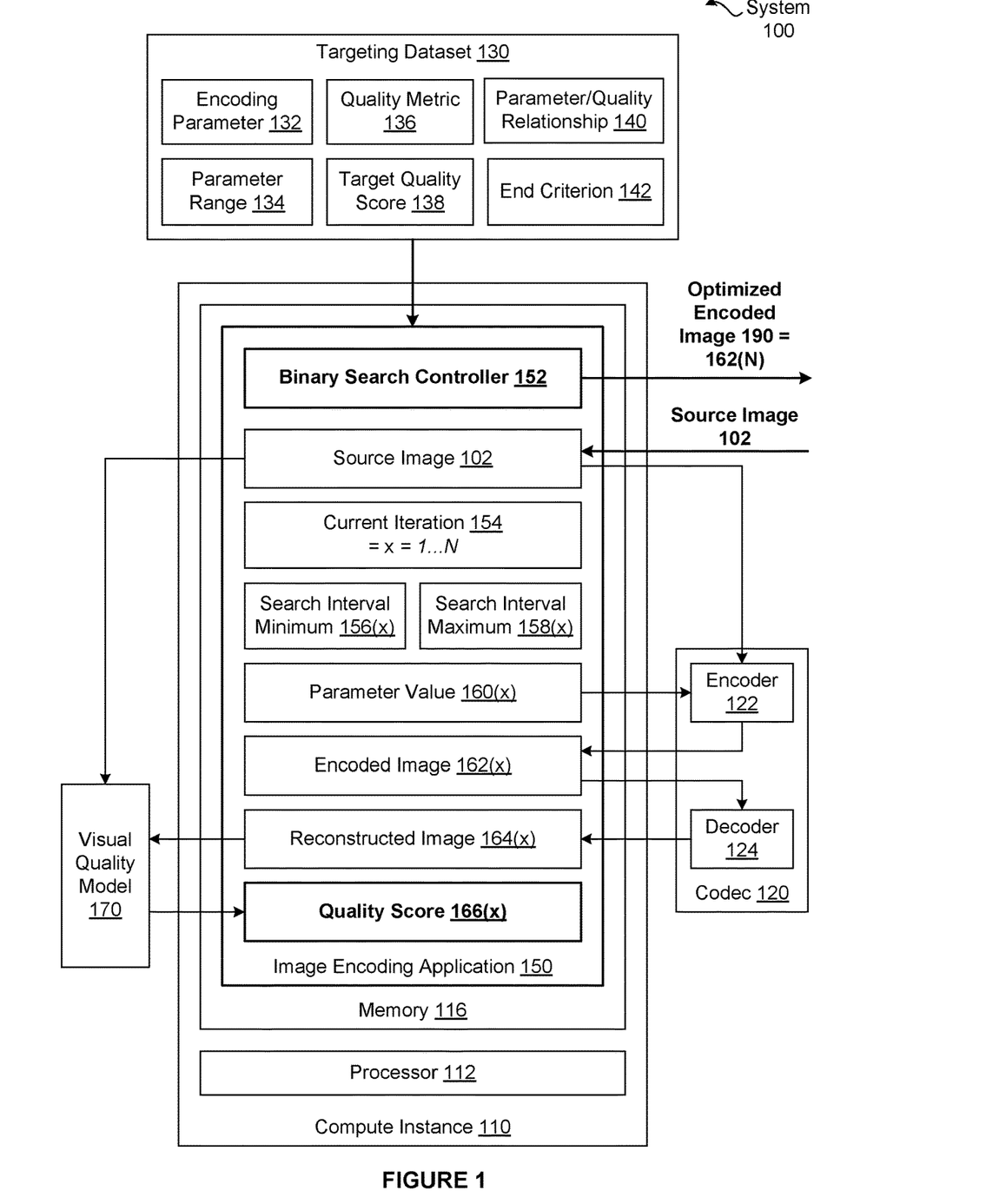
- FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, a compute instance 110, a coder/decoder ("codec") 120, a visual quality model 170, and a targeting dataset 130. For explanatory purposes, multiple instances of like objects are denoted with reference numbers identifying the object and parenthetical alphanumeric characters identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110, any number of codecs 120, any number of visual quality models 170, and any number of targeting datasets 130, in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory ("CD-ROM"), an optical storage device, a magnetic storage device, or any suitable combination of the foregoing.

The compute instance 110 is configured to implement one or more applications or subsystems of applications. For explanatory purposes only, each application is depicted as residing in the memory 116 of the compute instance 110 and executing on a processor 112 of the compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to encode a source image 102. As described previously herein, in a conventional approach to encoding source images, a developer configures an encoder to encode each of any number of source images based on a target file size or an encoding parameter value. One drawback of this conventional approach is that variations in the complexity of the source images may result in subpar tradeoffs between file size and visual quality level for some of the source images. In that regard, relatively complex source images could be encoded using fewer bits than are necessary to achieve an acceptable level of visual quality. Conversely, relatively simple source images could be encoded using more bits than are necessary to achieve a particular level of visual quality.

Optimizing Encoding to Achieve a Target Level of Visual Quality

To address the above problems, the compute instance 110 includes, without limitation, an image encoding application 150 that encodes the source image 102 to generate an optimized encoded image 190 that archives a target quality score 138. The target quality score 138 is a value for a quality metric 136 that quantifies a visual quality level for an optimized reconstructed image that is derived from the optimized encoded image 190. The target quality score 138 is also referred to herein as a target quality level and a target level of visual quality.

As shown, the image encoding application 150 resides in the memory 116 of the compute instance 110 and executes on the processor 112 of the compute instance 110. Although not shown in FIG. 1, any number of instances of the image encoding application 150 included in any number of compute instances 110 may be configured to generate optimized encoded images 190 for any number of source images 102 concurrently, sequentially, or any combination thereof, based on a single target quality score 138.

The codec 120 includes, without limitation, an encoder 122 and a decoder 124. The encoder 122 may execute any number of encoding and/or compression operations on the source image 102 to generate an encoded image 162. In a complementary fashion, the decoder 124 may execute any number of decoding and/or decompression operations on the encoded image 162 to generate a reconstructed image 164 that approximates the source image 102. The reconstructed image 164 is also referred to herein as a "reconstructed source image."

Each codec 120 may implement a different compression standard and each encoder 122 may implement a different compression algorithm that includes any number of encoding and/or compression operations to generate the encoded images 162. Some examples of compression algorithms include, without limitation, AV1 Image File Format ("AVIF"), Joint Photographic Experts Group ("JPEG"), JPEG 2000, WebP, High Efficiency Image Coding ("HEIC"), etc. Furthermore, each encoder 122 provides at least one parameter that influences how many bits the encoder 122 uses when encoding the source image 102. For example, some JPEG encoders 122 provide a quality parameter, some AV1 encoders 122 provide a quantization parameter ("QP"), and some HEIC encoders 122 provide a QP. Each of the parameters may influence the behavior of the associated encoder 122 in any technically feasible fashion.

The visual quality model 170 implements any technically feasible quality metric 136. In operation, the visual quality model 170 computes a quality score 166 that estimates a visual quality level of a given reconstructed image 164. The quality score 166 is a value for the quality metric 136. If the reconstructed image 164 has a particular quality score 166, then the encoded image 162 from which the reconstructed image 164 is derived is referred to herein as achieving the quality score 166. The visual quality model 170 may compute the quality score 166 in any technically feasible fashion based on any relevant information.

In some embodiments, the visual quality model 170 implements a no-reference quality metric 136 and computes the quality score 166 based on statistical features of the reconstructed image 164. An example of a no-reference quality metric 136 is Blind/Referenceless Image Spatial Quality Evaluator ("BRISQUE"). In other embodiments, the visual quality model 170 implements a reference-based quality metric 136 and computes the quality score 166 based on comparisons between the reconstructed image 164 and the associated source image 102. One example of a reference-based quality metric 136 is peak signal-to-noise ratio ("PSNR"). In yet other embodiments, the visual quality model 170 is a perceptual machine learning model that is trained based on subjective visual scores for test reconstructed images provided by human subjects. An example of a perceptual machine learning model is a Video Multimethod Assessment Fusion ("VMAF") model. In operation, the VMAF model fuses objective criteria associated with the reconstructed image 164 and the associated source image 102 to predict the quality score 166 that estimates the visual quality of the reconstructed image 164 as perceived when viewed by humans.

The targeting dataset 130 configures a binary search performed by the image encoding application 150 to optimize a parameter value 160 for an encoding parameter 132. The binary search is described in greater detail below and also in conjunction with FIG. 2. As shown, the targeting dataset 130 includes, without limitation, the encoding parameter 132, a parameter range 134, the quality metric 136, the target quality score 138, a parameter/quality relationship 140, and an end criterion 142. The encoding parameter 132 may be any parameter (e.g., option, mode, setting, etc.) that impacts the encoding operations performed by the encoder 122. Importantly, the encoding parameter 132 varies monotonically with respect to the quality metric 136.

The parameter range 134 specifies a range of valid values for the encoding parameter 132. The parameter/quality relationship 140 specifies a relationship between the encoding parameter 132 and the quality metric 136 and is either proportional or inversely proportional. If the parameter/quality relationship 140 is proportional, then as the parameter value 160 used to encode the source image 102 increases, the quality score 166 achieved by the associated encoded image 162 also increases. By contrast, if the parameter/quality relationship 140 is inversely proportional, then as the parameter value 160 used to encode the source image 102 increases, the quality score 166 achieved by the associated encoded image 162 decreases.

The end criterion 142 specifies the circumstance under which the image encoding application 150 is to end the binary search that optimizes the parameter value 160. The end criterion 142 may specify any technically feasible criterion, and the image encoding application 150 may evaluate the end criterion 142 in any technically feasible fashion. In some embodiments, the end criterion 142 is a tolerance with respect to the target quality score 138. For example, the end criterion 142 could specify that the image encoding application 150 is to end the binary search when the quality score 166 is within one of the target quality score 138. In other embodiments, the end criterion 142 is a maximum difference between the parameter values 160 associated with successive iterations. For example, the end criterion 142 could specify that the image encoding application 150 is to end the binary search when the difference in the parameter values 160 between successive iterations of the binary search is less than one.

As shown, the image encoding application 150 includes, without limitation, a binary search controller 152, the source image 102, the current iteration 154, a search interval minimum 156(x), a search interval maximum 158(x), the parameter value 160(x), the encoded image 162(x), the reconstructed image 164(x), and the quality score 166(x). For explanatory purposes only, the symbol "x" represents an iteration and may be any positive integer. Further, multiple instances of the search interval minimum 156, the search interval maximum 158, the parameter value 160, the encoded image 162, the reconstructed image 164, and the quality score 166 are denoted with reference numbers identifying the object and parenthetical alphanumeric characters identifying the associated iteration where needed.

The binary search controller 152 implements a binary search that optimizes the parameter value 160 used to generate the optimized encoded image 190. Initially, the binary search controller 152 sets the current iteration 154 equal to 1, the search interval minimum 156(1) equal to the minimum value in the parameter range 134, and the search interval maximum 158(1) equal to the maximum value in the parameter range 134. In general, the search interval minimum 156(x) and the search interval maximum 158(x) defines a search interval for the $x^{th}$ iteration. For each iteration, the binary search controller 152 executes an optimization process.

During the optimization process for the current iteration 154 of x, the binary search controller 152 sets the parameter value 160(x) equal to the average of the search interval minimum 156(x) and the search interval maximum 158(x), rounded to the closest valid value of the encoding parameter 132 (e.g., the closest integer). In alternate embodiments, the binary search controller 152 may bisect the search interval defined by the search interval minimum 156(x) and the search interval maximum 158(x) in any technically feasible fashion to determine the parameter value 160(x). As referred to herein, "bisecting" a search interval is dividing the search interval into two usually, but not always, equal parts.

The binary search controller 152 then configures the encoder 122 to encode the source image 102 at the parameter value 160(x) to generate the encoded image 162(x). Subsequently, the binary search controller 152 configures the decoder 124 to decode the encoded image 162(x) to generate the reconstructed image 164(x). The binary search controller 152 inputs the reconstructed image 164(x) and, optionally, the source image 102 into the visual quality model 170. In response, the visual quality model 170 computes the quality score 166(x) for the reconstructed image 164(x). The binary search controller 152 then determines whether the end criterion 142 is met.

If the binary search controller 152 determines that the end criterion 142 is not met, then the binary search controller 152 increments the current iteration 154 (e.g., x=x+1). The binary search controller 152 then updates the search interval minimum 156(x) and the search interval maximum 158(x) based on the parameter value 160(x−1) and the quality score 166(x−1) associated with the previous iteration (x-1). More precisely, the binary search controller 152 sets the search interval minimum 156(x) and the search interval maximum 158(x) to define either the upper or lower half of the search interval associated with the previous iteration (x-1) based on the quality score 166(x−1) and the target quality score 138. In some embodiments, the binary search controller 152 sets the search interval minimum 156(x) and the search interval maximum 158(x) based on the following table 1:

TABLE 1

| Parameter/quality relationship 140 | Quality score 166(x − 1) greater than target quality score 138? | Search interval minimum 156(x) | Search interval maximum 158(x) |
|---|---|---|---|
| proportional | yes | search interval minimum 156(x − 1) | parameter value 160(x − 1) |
| proportional | no | parameter value 160(x − 1) | search interval maximum 158(x − 1) |
| inversely proportional | yes | parameter value 160(x − 1) | search interval maximum 158(x − 1) |

TABLE 1-continued

| Parameter/quality relationship 140 | Quality score 166(x − 1) greater than target quality score 138? | Search interval minimum 156(x) | Search interval maximum 158(x) |
|---|---|---|---|
| inversely proportional | no | search interval minimum 156(x − 1) | parameter value 160(x − 1) |

The binary controller 152 then executes the optimization process described above for the current iteration 154. The binary controller 152 continues to iteratively execute the optimization process for successive current iterations 154 until the binary search controller 152 determines that the end criterion 142 is met.

If the binary search controller 152 determines that the end criterion 142 is met, then the binary search controller 152 stores the encoded image 162(x) as the optimized encoded image 190. The binary search controller 152 then transmits the optimized encoded image 190 to any number (including zero) of other software applications. For instance, the binary search controller 152 could transmit the optimized encoded image 190 or the location of the optimized encoded image 190 to a web page generator (not shown) that generates web pages or a web page application (not shown) that executes in a web browser and displays web pages.

Advantageously, because the image encoding application 150 individually optimizes the number of bits used to encode the source image 102, relatively complex source images 102 are ultimately encoded using enough bits to ensure that the associated reconstructed image 164 meets the target quality score 138. Furthermore, the number of bits unnecessarily wasted when encoding relatively simple source images 102 can be reduced relative to prior art approaches that use a single target file size or a single encoding parameter value for multiple source images.

It will be appreciated that the system 100 shown herein is illustrative and that variations and modifications are possible. The connection topology, including the location and arrangement of the compute instance 110, the codec 120, the encoder 122, the decoder 124, the visual quality model 170, and the targeting dataset 130 may be modified as desired. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Figure 2:
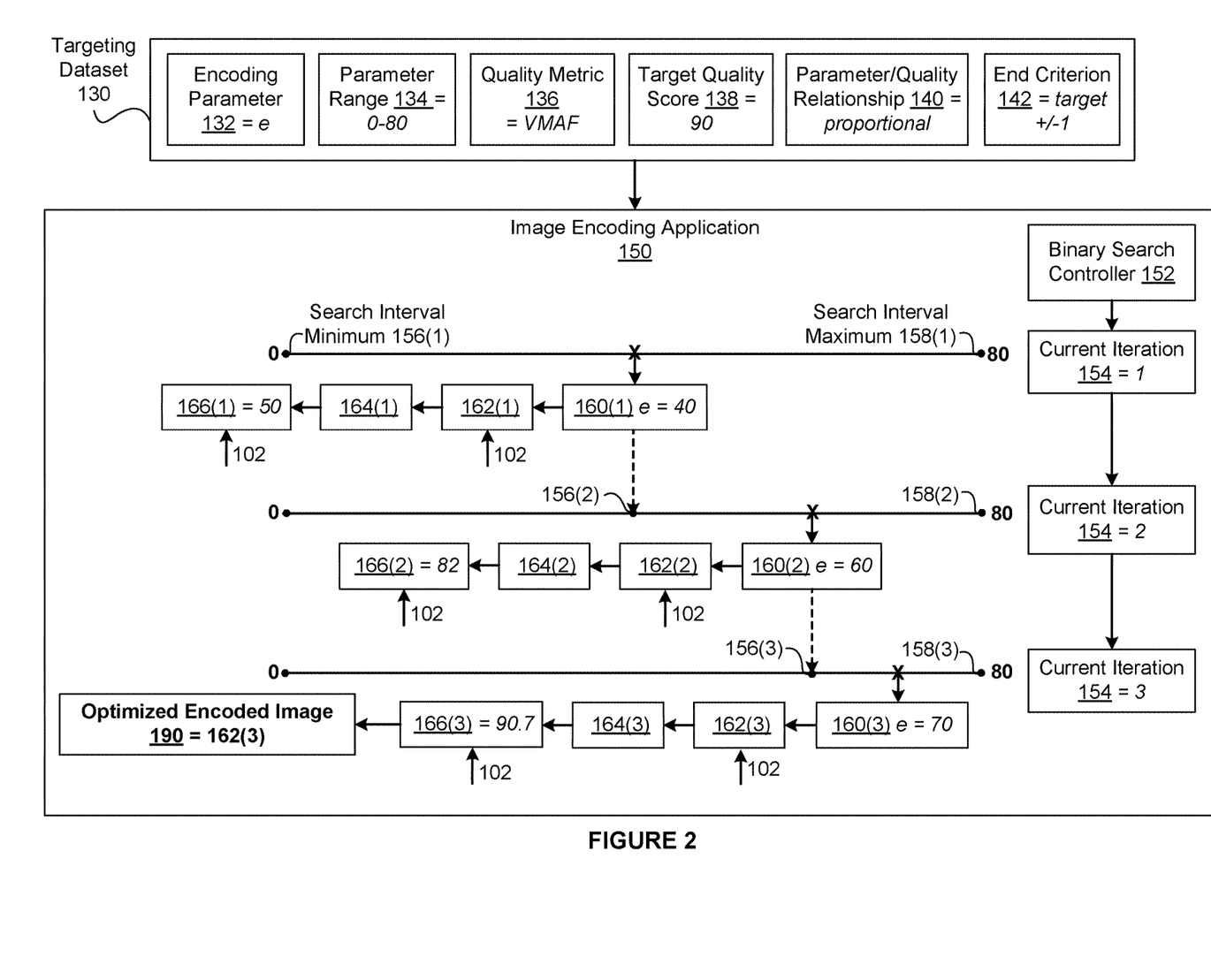
FIG. 2 illustrates an example of how the image encoding application of FIG. 1 generates an optimized encoded image, according to various embodiments.

FIG. 2 illustrates an example of how the image encoding application 150 of FIG. 1 generates the optimized encoded image 190, according to various embodiments. For explanatory purposes only, the image encoding application 150 generates the optimized encoded image 190 based on an exemplary source image 102 and the exemplary targeting dataset 130 having the italicized values depicted in FIG. 2.

As shown, the targeting dataset 130 includes, without limitation, a hypothetical encoding parameter 132 of "e," a parameter range 134 of 0 to 80, the quality metric 136 of VMAF, the target quality score 138 of 90, a parameter/quality relationship 140 of proportional, and an end criterion 142 of "target +/−1". The end criterion 142 of "target +/−1 specifies that the image encoding application 150 is to end the binary search when the quality score 166 is within one of the target quality score 138.

As shown, the binary search controller 152 initially sets the current iteration 154 equal to 1, the search interval minimum 156(1) equal to 0 (the minimum value in the parameter range 134), and the search interval maximum 158(1) equal to 80 (the maximum value in the parameter range 134). The binary search controller 152 then sets the parameter value 160(1) equal to 40 (the average of the search interval minimum 156(1) and the search interval maximum 158(1)). For explanatory purposes only, FIG. 2 graphically depicts the search interval minimum 156(1), the search interval maximum 158(1), and the parameter value 160(1) along a horizontal axis specifying values for the encoding parameter 132.

Although not shown in FIG. 2, the binary search controller 152 configures the encoder 122 to encode the source image 102 at the parameter value 160(1) to generate the encoded image 162(1). Subsequently, the binary search controller 152 configures the decoder 124 to decode the encoded image 162(1) to generate the reconstructed image 164(1). Although not shown in FIG. 2, the binary search controller 152 inputs the reconstructed image 164(1) and the source image 102 into the visual quality model 170 that implements the VMAF metric. In response, the visual quality model 170 computes the quality score 166(1) of 50 for the reconstructed image 164(1).

Because the quality score 166(1) of 50 is not within one of the target quality score 138 of 90, the binary search controller 152 determines that the end criterion 142 is not met and, as a result, increments the current iteration 154 to 2. Since the parameter/quality relationship 140 is proportional and the quality score 166(1) of 50 is not greater than the target quality score 138 of 90, the binary search controller 152 sets the search interval minimum 156(2) equal to the parameter value 160(1) of 40 and the search interval maximum 158(2) equal to the search interval maximum 158(1).

The binary search controller 152 then sets the parameter value 160(2) equal to 60 (the average of the search interval minimum 156(2) and the search interval maximum 158(2)). For explanatory purposes only, FIG. 2 graphically depicts the search interval minimum 156(2), the search interval maximum 158(2), and the parameter value 160(2) along a horizontal axis specifying values for the encoding parameter 132.

Although not shown in FIG. 2, the binary search controller 152 configures the encoder 122 to encode the source image 102 at the parameter value 160(2) to generate the encoded image 162(2). Subsequently, the binary search controller 152 configures the decoder 124 to decode the encoded image 162(2) to generate the reconstructed image 164(2). Although not shown in FIG. 2, the binary search controller 152 inputs the reconstructed image 164(2) and the source image 102 into the visual quality model 170 that implements the VMAF metric. In response, the visual quality model 170 computes the quality score 166(2) of 82 for the reconstructed image 164(2).

Because the quality score 166(2) of 82 is not within one of the target quality score 138, the binary search controller 152 determines that the end criterion 142 is not met and, as a result, increments the current iteration 154 to 3. Since the parameter/quality relationship 140 is proportional and the quality score 166(2) of 82 is not greater than the target quality score 138 of 90, the binary search controller 152 sets the search interval minimum 156(3) equal to the parameter value 160(2) of 60 and the search interval maximum 158(3) equal to the search interval maximum 158(2).

The binary search controller 152 then sets the parameter value 160(3) equal to 70 (the average of the search interval minimum 156(3) and the search interval maximum 158(3)). For explanatory purposes only, FIG. 2 graphically depicts the search interval minimum 156(3), the search interval maximum 158(3), and the parameter value 160(3) along a horizontal axis specifying values for the encoding parameter 132.

Although not shown in FIG. 2, the binary search controller 152 configures the encoder 122 to encode the source image 102 at the parameter value 160(3) to generate the encoded image 162(3). Subsequently, the binary search controller 152 configures the decoder 124 to decode the encoded image 162(3) to generate the reconstructed image 164(3). Although not shown in FIG. 2, the binary search controller 152 inputs the reconstructed image 164(3) and the source image 102 into the visual quality model 170 that implements the VMAF metric. In response, the visual quality model 170 computes the quality score 166(3) of 90.7 for the reconstructed image 164(3).

Because the quality score 166(3) of 90.7 is within one of the target quality score 138 of 90, the binary search controller 152 determines that the end criterion 142 is met. As a result, the binary search controller 152 sets the optimized encoded image 190 equal to the encoded image 162(3). The optimized encoded image 190 is therefore associated with the parameter value 160(3) of 60 and achieves the quality score 166(3) of 90.7.

Figure 3:
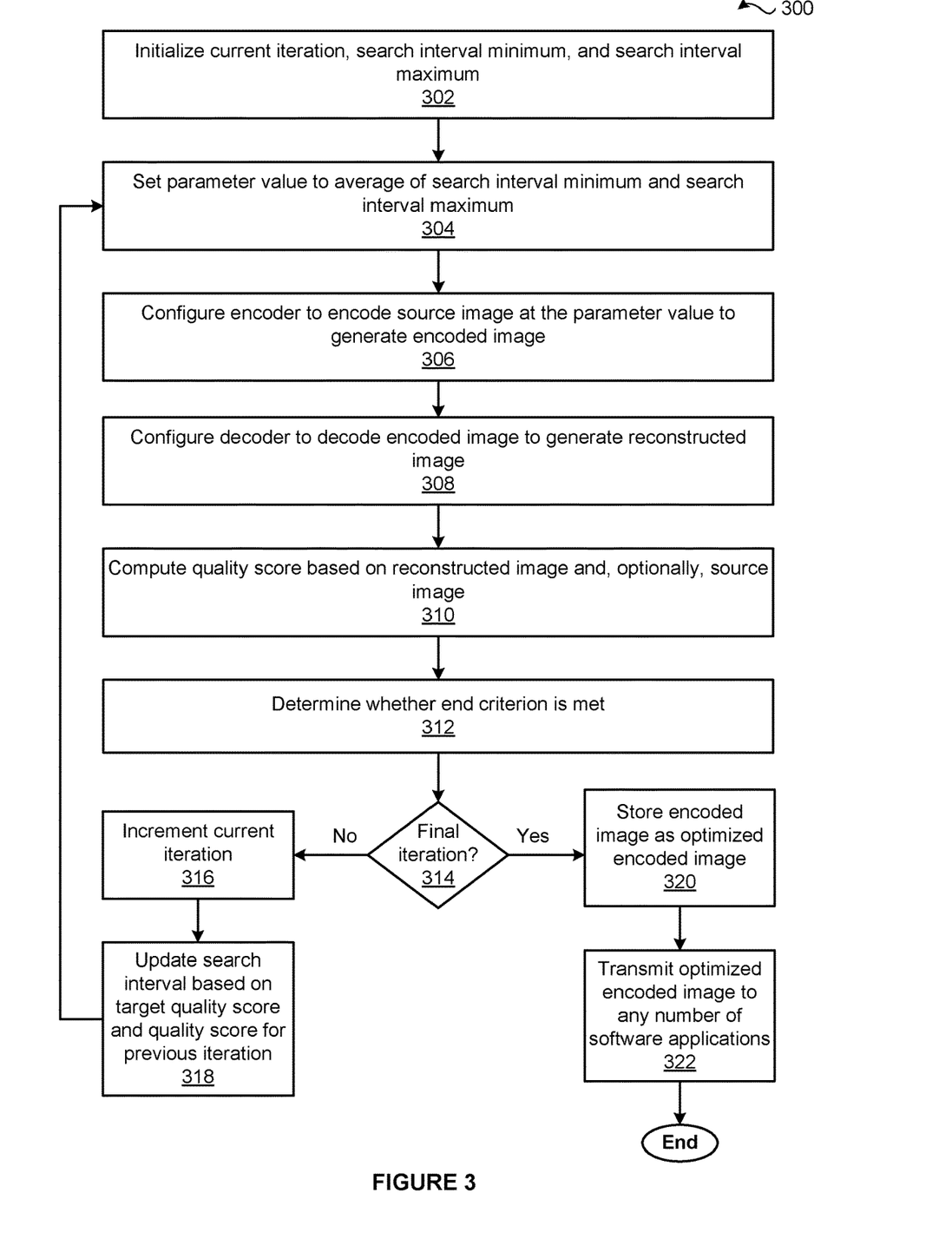
FIG. 3 is a flow diagram of method steps for encoding an image, according to various embodiments.

FIG. 3 is a flow diagram of method steps for encoding an image, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the binary search controller 152 initializes the current iteration 154 to 1 (x=1), the search interval minimum 156(1) to the minimum value in the parameter range 134, and the search interval maximum 158(1) to the maximum value in the parameter range 134.

At step 304, the binary search controller 152 sets the parameter value 160($x$) equal to the average of the search interval minimum 156($x$) and the search interval maximum 158($x$), rounded to the closest valid value of the encoding parameter 132 (e.g., the closest integer). At step 306, the binary search controller 152 configures the encoder 122 to encode the source image 102 at the parameter value 160($x$) to generate the encoded image 162($x$). At step 308, the binary search controller 152 configures the decoder 124 to decode the encoded image 162($x$) to generate the reconstructed image 164($x$).

At step 310, the binary search controller 152 computes the quality score 166($x$) based on the reconstructed image 164($x$) and, optionally, the source image 102. The binary search controller 152 may compute the quality score 166($x$) in any technically feasible fashion. For instance, in some embodiments, the binary search controller 152 inputs the reconstructed image 164($x$) and, optionally, the source image 102 into the visual quality model 170. In response, the visual quality model 170 computes the quality score 166($x$) for the reconstructed image 164($x$).

At step 312, the binary search controller 152 determines whether the end criterion 142 is met. At step 314, the binary search controller 152 determines whether the current iteration 154 is the final iteration based on whether the end criterion 142 is met. If, at step 314, the binary search controller 152 determines that the current iteration 154 is not the final iteration, then the method 300 proceeds to step 316. At step 316, the binary search controller 152 increments the current iteration 154 (x=x+1).

At step 318, the binary search controller 152 updates the search interval based on the target quality score 138 and the quality score 166($x$-1) associated with the previous interval. The method 300 then returns to step 304, where the binary search controller 152 computes the parameter value 160($x$). The binary search controller 152 continues to cycle through steps 304-318 until, at step 314, the binary search controller 152 determines that the current iteration 154 is the final iteration.

If, however, at step 314, the binary search controller 152 determines that the current iteration 154 is the final iteration, then the method 300 proceeds directly to step 320. At step 320, the binary search controller 152 stores the encoded image 162($x$) as the optimized encoded image 190. At step 322, the binary search controller 152 transmits the optimized encoded image 190 to any number (including zero) of other software applications. The method 300 then terminates.

In various embodiments, one or more software applications use the image encoding application 150 to more effectively compare the compression efficiency of multiple codecs 120 relative to prior art techniques. In one prior-art approach to comparing the compression efficiency of two codecs, a Bjontegaard delta rate ("BD-rate") application configures each of the codecs to encode multiple source images at various different parameter values. The BD-rate application then computes the bitrates of and quality scores achieved by each of the encoded images. Subsequently, for each codec, the BD-rate application generates a separate rate-quality curve based on the bitrates of and quality scores achieved by the associated encoded images. Finally, the BD-rate application computes a BD-rate value based on the portions of the two rate-quality curves having the same "shared" bitrates. The BD-rate value specifies a percentage bitrate change when encoding using one of the codecs relative to encoding using the other codec while maintaining the same quality score over the shared bitrates.

One drawback of BD-rate values is that the relevance of BD-rate values can be reduced by the inclusion of encoded images that have bitrates and/or achieve quality scores that are not typically used when encoding images for production/deployment. For example, a BD-rate value could be computed using some encoded images that do not achieve acceptable levels of visual quality. Consequently, drawing a valid conclusion regarding whether the one codec performs better than another codec based on a BD-rate value can be problematic. Furthermore, interpreting BD-rate values can be difficult for many developers.

Comparing Codecs at a Target Level of Visual Quality

To address the above problems, some embodiments include a codec comparison application that uses the image encoding application 150 to compute a bitrate change. The bitrate change specifies a percentage change in the number of bits expended when encoding the source images 102 to achieve the target quality score 138 using the codec 120(2) instead of the codec 120(1). The codec comparison application is described in greater detail below in conjunction with FIGS. 4 and 5.

Figure 4:
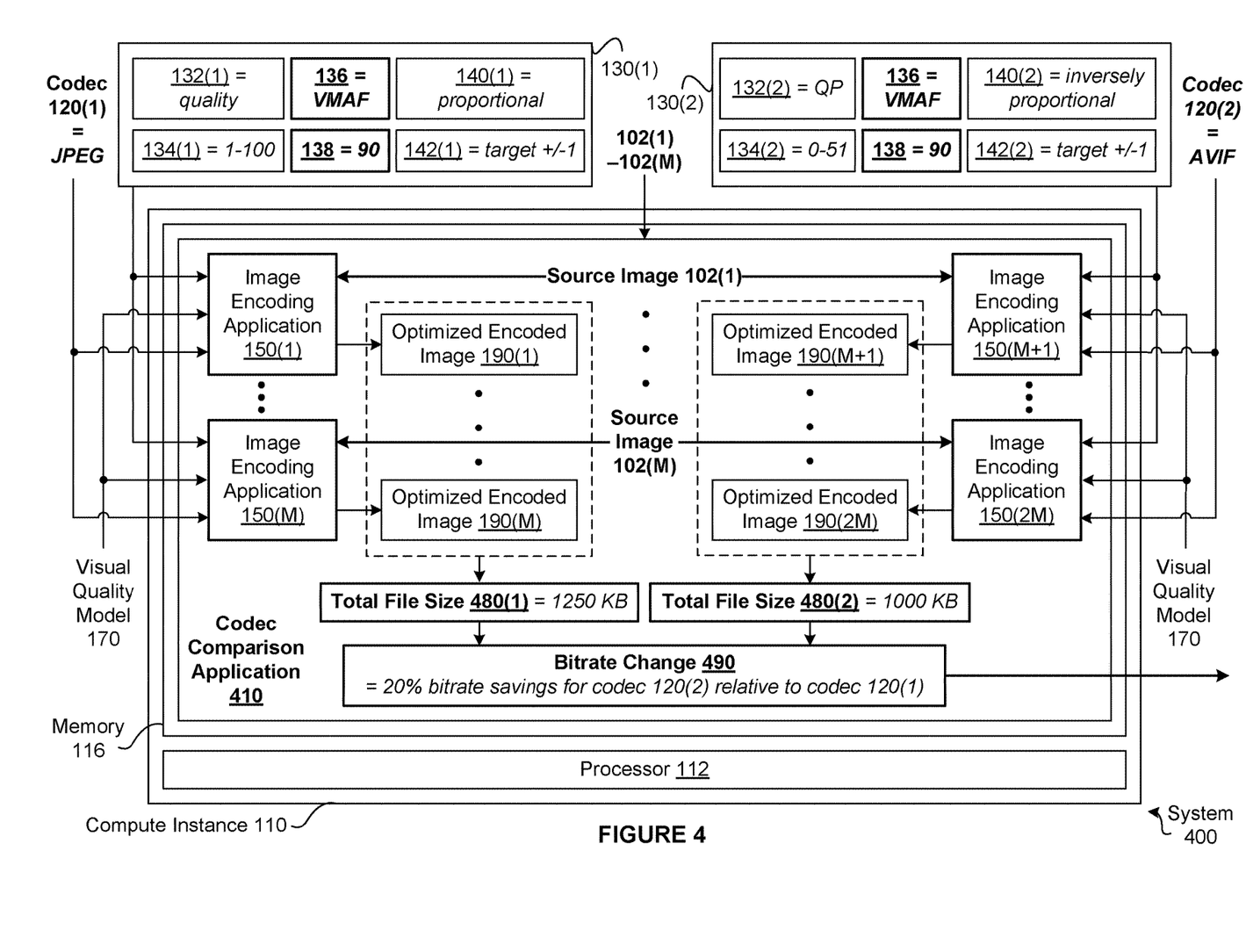
FIG. 4 is a conceptual illustration of a system configured to implement one or more aspects of the various embodiments.

FIG. 4 is a conceptual illustration of a system 400 configured to implement one or more aspects of the various embodiments. As shown, the system 400 includes, without limitation, the compute instance 110, the codec 120(1), the codec 120(2), the visual quality model 170, the targeting dataset 130(1), the target dataset 130(2), and the source images 102(1)-102(M), where M is any integer.

Any number of the components of the system 400 may be distributed across multiple geographic locations or implemented in one or more cloud computing environments (i.e., encapsulated shared resources, software, data, etc.) in any combination. In alternate embodiments, the system 100 may include any number of compute instances 110, any number of codecs 120, any number of visual quality models 170, and any number of targeting datasets 130, in any combination.

The compute instance 110 includes, without limitation, a codec comparison application 410 that computes a bitrate change 490 associated with encoding the source images 102 to achieve the target quality score 138 using the codec 120(2) instead of the codec 120(1). The codec comparison application 410 resides in the memory 116 of the compute instance 110 and executes on the processor 116 of the compute instance 110. As shown, the codec comparison application 410 includes, without limitation, the image encoding applications 150(1)-150(2M), total file sizes 480(1)-480(2), and the bitrate change 490. The image encoding applications 150(1)-150(2M) refer to 2M instances of the image encoding application 150. In alternate embodiments, the codec comparison application 410 may include, without limitation, any number of instances of the image encoding application 150, any number of total file sizes 480, and any number of bitrate changes 490.

For each of the codecs 120(1) and 120(2), the codec comparison application 410 executes M different instances of the image encoding application 150. More precisely, the codec comparison application 410 executes the image encoding applications 150(1)-150(M) to generate, respectively, the optimized encoded images 190(1)-190(M) based on the codec 120(1), the target dataset 130(1), the visual quality model 170, and, respectively, the source images 102(1)-102(M). The codec comparison application 410 also executes the image encoding applications 150(M+1)-150(2M) to generate, respectively, the optimized encoded images 190(M+1)-190(2M) based on the codec 120(1), the target dataset 130(1), the visual quality model 170 and, respectively, the source images 102(1)-102(M). In alternate embodiments, the codec comparison application 410 may execute any number of instances of the image encoding application 150 (including one) to generate the encoded images 190(1)-190(2M) concurrently, sequentially, or any combination thereof.

The target dataset 130(1) configures the different binary searches performed by the image encoding application 150 to generate the optimized encoded images 190(1)-190(M) that each achieve the target quality score 138 for the quality metric 136. Similarly, the target dataset 130(2) configures the different binary searches performed by the image encoding application 150 to generate the optimized encoded images 190(M+1)-190(2M) that each achieve the target quality score 138 for the quality metric 136.

For explanatory purposes only, exemplary values for the quality model 170, the codec 120(1), the codec 120(2), target dataset 130(1) and the target dataset 130(2) are depicted in italics. As shown, the quality model 170 implements a VMAF metric, the codec 120(1) implements a JPEG standard, and the codec 120(2) implements an AVIF standard. The target dataset 130(1) includes, without limitation, the encoding parameter 132(1) of "quality," the parameter range 134(1) of 1 to 100, the quality metric 136 of VMAF, the target quality score 138 of 90, the parameter/quality relationship 140(1) of proportional, and the end criterion 142 of "target +/−1". The target dataset 130(2) includes, without limitation, the encoding parameter 132(2) of "QP," the parameter range 134(2) of 0 to 51, the quality metric 136 of VMAF, the target quality score 138 of 90, the parameter/quality relationship 140(2) of inversely proportional, and the end criterion 142(2) of "target +/−1".

Because the codec 120(2) differs from the codec 120(1), any number of the encoding parameter 132(2), the parameter range 134(2), the parameter/quality relationship 140(2), and the end criterion 142(2) may differ from, respectively, the encoding parameter 132(1), the parameter range 134(1), the parameter/quality relationship 140(1), and the end criterion 142(1). However, and as indicated in FIG. 2 in bold, the quality metric 136 and the target quality score 138 specified in the target dataset 130(2) match, respectively, the quality metric 136 and the target quality score 138 specified in the target dataset 130(1). Accordingly, each of the encoded images 190 generated by the image encoding application 150 achieves the same target quality score 138 for the same quality metric 136.

In various embodiments, if the quality metric 136 and the target quality score 138 specified in the target dataset 130(2) do not match, respectively, the quality metric 136 and the target quality score 138 specified in the target dataset 130(1), then the codec comparison application 410 indicates an error. In alternate embodiments, the codec comparison application 410 generates the target datasets 130(1) and 130(2) in any technically feasible fashion. For instance, the codec comparison application 410 could obtain user input via a graphical user interface ("GUI") and generate the target datasets 130 based on the user input. As part of generating the target datasets 130(1) and 130(2), the codec comparison application 410 ensures that the quality metric 136 and the target quality score 138 specified in the target dataset 130(2) match, respectively, the quality metric 136 and the target quality score 138 specified in the target dataset 130(1).

After generating the optimized encoded images 190(1)-190(M), the codec comparison application 410 sets the total file size 480(1) equal to the sum of the file sizes of the optimized encoded images 190(1)-190(M). Accordingly, the total file size 480(1) specifies the total number of bits that the codec 120(1) used to encode the source images 102(1)-102(M) to generate the optimized encoded images 190(1)-190(M). Similarly, after generating the optimized encoded images 190(M+1)-190(2M), the image encoding application 150 sets the total file size 480(2) equal to the sum of the file sizes of the optimized encoded images 190(M+1)-190(2M). Accordingly, the total file size 480(2) specifies the total number of bits that the codec 120(2) used to encode the source images 102(1)-102(M) to generate the optimized encoded images 190(M+1)-190(2M).

The codec comparison application 410 computes the bitrate change 490 based on the total file sizes 480(1) and 480(2). The bitrate change 490 specifies a percentage difference in the bits expended when encoding the source images 102 to achieve the target quality score 138 when using the codec 120(2) instead of the codec 120(1). As persons skilled in the art will recognize, the bitrate change 490 correlates to a difference in compression efficiency between the codecs 120(2) and 120(1). The codec comparison application 410 may compute the bitrate change 490 in any technically feasible fashion.

In some embodiments, the codec comparison application 410 divides the total file size 480(2) by the file size 480(1) and then multiples the resulting difference by 100. If the bitrate change 490 is negative, then the bitrate change 490 is a percentage decrease, the absolute value of the bitrate change 490 is a "bitrate savings," and the compression efficiency of the codec 120(2) is superior to the compression efficiency of the codec 120(1). Otherwise, the bitrate change 490 is a percentage increase, and the compression efficiency of the codec 120(2) is not superior to the compression efficiency of the codec 120(1). In alternate embodiments, the codec comparison application 410 may compute any number of statistics that are relevant to comparing the codecs 120 instead of or in addition to the bitrate change 490 in any technically feasible fashion.

The codec comparison application 410 displays and/or transmit the bitrate change 490 to any number of software applications for use in comparing the codecs 120(1) and 120(2). In alternate embodiments, the codec comparison application 410 may display and/or transmit any number of the total file sizes 480(1) and 480(2) and the optimized encoded images 190(1)-190(2M) to any number of software applications. In some embodiments, because of each of the optimized encoded images 190 achieves the target quality score 138, any number of the optimized encoded images 190 may be deployed.

Advantageous, because the optimized encoded images 190 used to compute the bitrate change 490 achieve the target quality score 138, the bitrate change 490 accurately quantifies the compression efficiency of the codec 120(2) relative to the compression efficiency of the codec 120(1) at the target quality score 138. Consequently, relative to a BD-rate, the bitrate change 190 can be used to draw a more valid conclusion regarding whether the codec 120(2) performs better than the codec 120(1) for the target quality score 138. Furthermore, relative to a BD-rate, the bitrate change 490 is a more intuitive metric of compression efficiency.

It will be appreciated that the system 400 shown herein is illustrative and that variations and modifications are possible. The connection topology, including the location and arrangement of the compute instance 110, the codecs 120(1) and 120(2), the visual quality model 170, and the targeting datasets 130(1) and 130(2) may be modified as desired. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

For instance, in alternate embodiments, the codec comparison application 410 may be configured to generate a different bitrate change 490 for each of any number of test codecs 120. Each bitrate change 490 may specify a different percentage of bits that are saved when using the associated test codec 120 instead of a baseline codec 120 for encoding the source images 102 to achieve the target quality score 138.

In the same or other alternate embodiments, the codec comparison application 410 may be modified to compare the compression efficiency of any number of "encoding configurations." As referred to herein, an encoding configuration specifies a combination of a codec and values for any number (including zero) and type of "configuration parameters." To encode the source image 102 using the $x^{th}$ encoding configuration, the codec comparison application 410 configures the image encoding application 150($x$) to encode each of the source images 102 using the specified codec 120($x$) at the specified values for the configuration parameters. Unlike the encoding parameter 132($x$), the image encoding application 150($x$) does not vary the values for the configuration parameters. Each configuration parameter associated with the $x^{th}$ encoding configuration may be any option, mode, setting, etc., (other than the encoding parameter 132($x$)) that impacts the encoding operations performed by the encoder 122($x$) included in the codec 120($x$). Some examples of configuration parameters include, without limitation, a profile level, an analysis level, a search level, a psycho-visual option, a performance option, a tuning option, and so forth. In some embodiments, the configuration parameters associated with one encoding configuration may vary from the configuration parameters associated with another encoding configuration. In some alternate embodiments, the codec comparison application 410 may be modified to compare the compression efficiency of different sets of values for a single set of configuration parameters for a single codec 120.

In some alternate embodiments, a targeted BD-rate application (not shown) computes a BD-rate value based on the codecs 120(1)-120(2), the source images 102(1)-102(M), and the target quality scores 138(1)-138(T), where T is an integer greater than one. The target quality scores 138(1) and 138(T) define a target quality range, and each of the target quality scores 138 lies within the target quality range. For each codec 120($x$), the targeted BD-rate application configures the image encoding application 150 to generate (T*M) optimized encoded images 190. Each of the optimized encoded images 190 associated with the codec 120($x$) corresponds to a different combination of the source images 102(1)-102(M) and the target quality scores 138(1)-138(T). The targeted BD-rate application then computes a BD-rate value based on the (2*T*M) optimized encoded images 190. Advantageously, the range of quality scores over which the targeted BD-rate application computes the BD-rate is defined by the target quality range. Consequently, the relevance of the BD-rate value computed via the targeted BD-rate application is increased relative to a BD-rate value that would be computed via a conventional approach to computing BD-rate values based on predetermined encoding parameter values.

Figure 5:
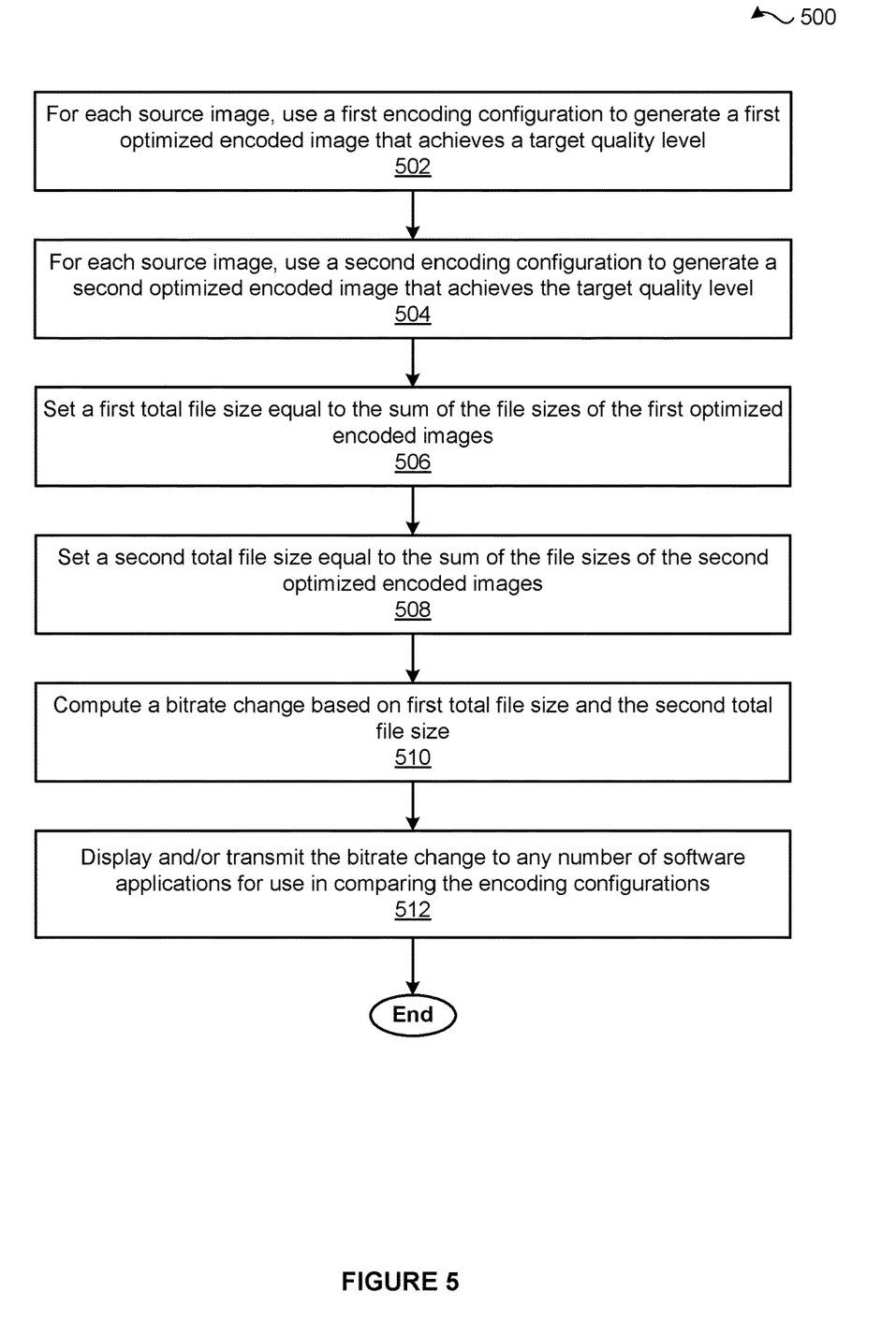
FIG. 5 is a flow diagram of method steps for comparing encoding configurations, according to various embodiments.

FIG. 5 is a flow diagram of method steps for comparing encoding configurations, according to various embodiments. Although the method steps are described with reference to the systems of FIGS. 1-2 and FIG. 4, persons skilled in the art will understand that any system configured to implement the method steps, in any order, falls within the scope of the embodiments.

As shown, a method 500 begins at step 502, where for each source image 102($j$), where j ranges from 1 to M, the codec comparison application 410 uses a first encoding configuration to generate a "first" optimized encoded image 190($j$) that achieves the target quality score 138. The codec comparison application 410 may generate the optimized encoded images 190(1)-190(M) for any encoding configuration and in any technically feasible fashion. In some embodiments, for each source image 102($j$), the codec comparison application 410 configures the image encoding application 150 to generate the optimized encoded image 190($j$) based on the targeting dataset 130(1) and the codec 120(1).

At step 504, for each source image 102($j$), where j ranges from 1 to M, the codec comparison application 410 uses a second encoding configuration to generate a "second" optimized encoded image 190(M+j) that achieves the target quality score 138. The codec comparison application 410 may generate the optimized encoded images 190(M+1)-190(2M) for any encoding configuration and in any technically feasible fashion. In some embodiments, for each source image 102(j), the codec comparison application 410 configures the image encoding application 150 to generate the optimized encoded image 190(M+j) based on the targeting dataset 130(2) and the codec 120(2).

At step 506, the codec comparison application 410 sets the total file size 480(1) equal to the sum of the file sizes of the first optimized encoded images 190(1)-190(M). At step 508, the codec comparison application 410 sets the total file size 480(2) equal to the sum of the file sizes of the second optimized encoded images 190(M+1)-190(2*M). At step 510, the codec comparison application 410 computes the bitrate change 490 based on total file size 480(1) and the total file size 480(2). At step 512, the codec comparison application 410 displays and/or transmits the bitrate change 490 to any number (including zero) of other software applications for use in comparing the encoding configurations. The method 500 then terminates.

In sum, the disclosed techniques may be used to encode a source image to achieve a target quality level. In one embodiment, an image encoding application executes a binary search to generate an optimized encoded image based on a target quality score for a quality metric that is monotonic with respect to an encoding parameter. The image encoding application includes, without limitation, a binary search controller. The binary search controller initializes a current iteration to specify a first iteration and a current search interval to span the valid parameter values for the encoding parameter. The binary search controller then executes an optimization process for the first iteration.

During the optimization process, the binary search controller sets a parameter value to the mid-point of the search interval. The binary search controller configures an encoder included in a codec to encode the source image at the parameter value to generate an encoded image. Subsequently, the binary search controller configures a decoder included in the codec to decode the encoded image. The binary search controller inputs the resulting reconstructed image and the source image to a visual quality model that, in response, outputs a quality score. If the quality score does not fall within a specified tolerance of the target quality score, then the image encoding application increments the current iteration, halves the search interval, and re-executes the optimization process for the current iteration. If the quality score falls within the specified tolerance, then the binary search controller sets the optimized encoded image equal to the encoded image.

In one embodiment, a codec comparison application uses the image encoding application to compare the compression efficiency of two codecs at the target quality score. The codec comparison application configures the image encoding application to encode a set of source images using the first codec to generate a first set of optimized encoded images that each achieve the target quality score. The codec comparison application also configures the image encoding application to encode the set of source images using the second codec to generate a second set of optimized encoded images that each achieve the target quality score. The codec comparison application then computes a bitrate change based on the total file size of the first set of optimized encoded images and the total file size of the second set of optimized encoded images. The bitrate change specifies a percentage change in the number of bits expended when associated with generating an optimized encoded image that achieves the target quality score using the second codec instead of the first codec.

At least one technical advantage of the disclosed techniques relative to the prior art is that, with the disclosed techniques, the image encoding application optimizes the number of bits used during encoding to achieve a target quality level. Because the image encoding application automatically adjusts the parameter value for each source image, relatively complex source images are encoded using enough bits to ensure that the target quality level is met when displaying reconstructed images derived from the encoded images. Further, the number of bits unnecessarily wasted when encoding relatively simple source images can be reduced relative to prior art approaches that use a single target file size or a single encoding parameter value for multiple source images. As a result, both the storage resources required to store the resulting encoded images on a website server and the bandwidth required to transmit the encoded source images to web browser applications can be reduced. In addition, the image encoding application can be used to compute a bitrate change that, relative to a BD-rate, can be used to more accurately and intuitively compare the compression efficiency of two codecs. These technical advantages provide one or more technological advancements over prior art approaches.

1. In some embodiments, a computer-implemented method for analyzing encoding configurations comprises, for each source image included in a plurality of source images, encoding the source image using a first encoding configuration to generate an encoded image, wherein the encoded image is included in a first plurality of encoded images, and wherein a visual quality score for a reconstructed source image derived from the encoded image falls within a tolerance of a target visual quality score; for each source image included in the plurality of source images, encoding the source image using a second encoding configuration to generate an encoded image, wherein the encoded image is included in a second plurality of encoded images, and wherein a visual quality score for a reconstructed source image derived from the encoded image falls within a tolerance of a target visual quality score; computing a first total file size for the first plurality of encoded images and a second total file size for the second plurality of encoded images; and computing a bitrate change based on the first total file size and the second total file size.

2. The computer-implemented method of clause 1, wherein the first encoding configuration specifies a first encoder that is included in a first codec, and the second encoding configuration specifies a second encoder that is included in a second codec that is different than the first codec.

3. The computer-implemented method of clauses 1 or 2, wherein the first encoding configuration specifies a first encoder and a first value for a configuration parameter that is associated with the first encoder, the second encoding configuration specifies the first encoder and a second value for the first configuration parameter, and wherein the first value is not equal to the second value.

4. The computer-implemented method of any of clauses 1-3, wherein the first encoding configuration specifies a first encoder that implements one of an AVIF, JPEG, JPEG 2000, WebP, or HEIC compression algorithm.

5 The computer-implemented method of any of clauses 1-4, wherein the first encoding configuration specifies a first encoder and at least one of a profile level, an analysis level, a search level, a psycho-visual option, a performance option, or a tuning option.

6. The computer-implemented method of any of clauses 1-5, wherein computing the bitrate change comprises computing a percentage change between the first total file size and the second total file size.

7. The computer-implemented method of any of clauses 1-6, wherein the target quality score comprises a PSNR, a value for a VMAF metric, or a value for a BRISQUE metric.

8. The computer-implemented method of any of clauses 1-7, wherein each encoded image included in the first plurality of encoded images is encoded at a different value for an encoding parameter.

9. The computer-implemented method of any of clauses 1-8, wherein encoding a first source image included in the plurality of source images using the first encoding configuration comprises determining a first value for an encoding parameter based on the first source image, an encoder, and a search interval associated with an encoding parameter; and causing the encoder to encode the first source image at the first value for the encoding parameter.

10. The computer-implemented method of any of clauses 1-9, wherein encoding a second source image included in the plurality of source images using the first encoding configuration comprises determining a second value for the encoding parameter based on the second source image, the encoder, and the search interval; and causing the encoder to encode the second source image at the second value for the encoding parameter.

11. In some embodiments, one or more non-transitory computer readable media include instructions that, when executed by one or more processors, cause the one or more processors to analyze encoding configurations by performing the steps of generating a first plurality of encoded images based on a plurality of source images and a first encoding configuration, wherein each encoded image included in the first plurality of encoded images is associated with a different visual quality level that falls within a tolerance of a target visual quality level; generating a second plurality of encoded images based on the plurality of source images and a second encoding configuration, wherein each encoded image included in the second plurality of encoded images is associated with a different visual quality level that falls within a tolerance of a target visual quality level; computing a first total file size for the first plurality of encoded images and a second total file size for the second plurality of encoded images; and computing a bitrate change based on the first total file size and the second total file size.

12. The one or more non-transitory computer readable media of clause 11, wherein the first encoding configuration specifies a first encoder and a first value for a first configuration parameter that is associated with the first encoder, and the second encoding configuration specifies a second encoder and a second value for a second configuration parameter that is associated with the second encoder.

13. The one or more non-transitory computer readable media of clauses 11 or 12, wherein the first encoding configuration specifies a first encoder and a first value for a configuration parameter that is associated with the first encoder, the second encoding configuration specifies the first encoder and a second value for the first configuration parameter, and wherein the first value is not equal to the second value.

14. The one or more non-transitory computer readable media of any of clauses 11-13, wherein the first encoding configuration specifies a first encoder that implements one of an AVIF, JPEG, JPEG 2000, WebP, or HEIC compression algorithm.

15. The one or more non-transitory computer readable media of any of clauses 11-14, wherein the first encoding configuration specifies a first encoder and at least one of a profile level, an analysis level, a search level, a psycho-visual option, a performance option, or a tuning option.

16. The one or more non-transitory computer readable media of any of clauses 11-15, wherein the first encoding configuration specifies a first codec, the second encoding configuration specifies a second codec, and the bitrate change quantifies a difference in compression efficiency when encoding images via the first codec relative to encoding the images via the second codec while maintaining the target visual quality score.

17. The one or more non-transitory computer readable media of any of clauses 11-16, wherein the target visual quality level comprises a PSNR, a value for a VMAF metric, or a value for a BRISQUE metric.

18. The one or more non-transitory computer readable media of any of clauses 11-17, wherein generating the first plurality of encoded images comprises determining a first value for an encoding parameter based on a first source image included in the plurality of source images, an encoder specified via the first encoding configuration, and a search interval associated with the encoding parameter; and causing the encoder to encode the first source image at the first value for the encoding parameter to generate a first encoded image that is included in the first plurality of encoded images.

19. The one or more non-transitory computer readable media of any of clauses 11-18, wherein generating the first plurality of encoded images further comprises determining a second value for the encoding parameter based on a second source image included in the plurality of source images, the encoder, and the search interval; and causing the encoder to encode the second source image at the second value for the encoding parameter to generate a second encoded image that is included in the first plurality of encoded images.

20. In some embodiments, a system comprises one or more memories storing instructions; and one or more processors that are coupled to the one or more memories and, when executing the instructions, are configured to generate a first plurality of encoded images based on a plurality of source images, a first encoding configuration, a first search interval associated with a first encoding parameter, and a target visual quality level; generate a second plurality of encoded images based on the plurality of source images, a second encoding configuration, a second search interval associated with a second encoding parameter, and the target visual quality level; compute a first total file size for the first plurality of encoded images and a second total file size for the second plurality of encoded images; and compute a bitrate change based on the first total file size and the second total file size.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing encoding configurations, the method comprising:
    for each source image included in a plurality of source images, encoding the source image using a first encoding configuration to generate a first encoded image, wherein the first encoded image is included in a first plurality of encoded images, and wherein a visual quality score for a reconstructed source image derived from the first encoded image falls within a tolerance of a target visual quality score;
    for each source image included in the plurality of source images, encoding the source image using a second encoding configuration to generate a second encoded image, wherein the second encoded image is included in a second plurality of encoded images, and wherein a visual quality score for a reconstructed source image derived from the second encoded image falls within a tolerance of the target visual quality score;
    computing a first total file size for the first plurality of encoded images and a second total file size for the second plurality of encoded images; and
    computing a bitrate change based on the first total file size and the second total file size.

2. The computer-implemented method of claim 1, wherein the first encoding configuration specifies a first encoder that is included in a first codec, and the second encoding configuration specifies a second encoder that is included in a second codec that is different than the first codec.

3. The computer-implemented method of claim 1, wherein the first encoding configuration specifies a first encoder and a first value for a configuration parameter that is associated with the first encoder, the second encoding configuration specifies the first encoder and a second value for the first configuration parameter, and wherein the first value is not equal to the second value.

4. The computer-implemented method of claim 1, wherein the first encoding configuration specifies a first encoder that implements one of an AVIF, JPEG, JPEG 2000, WebP, or HEIC compression algorithm.

5. The computer-implemented method of claim 1, wherein the first encoding configuration specifies a first encoder and at least one of a profile level, an analysis level, a search level, a psycho-visual option, a performance option, or a tuning option.

6. The computer-implemented method of claim 1, wherein computing the bitrate change comprises computing a percentage change between the first total file size and the second total file size.

7. The computer-implemented method of claim 1, wherein the target quality score comprises a PSNR, a value for a VMAF metric, or a value for a BRISQUE metric.

8. The computer-implemented method of claim 1, wherein each encoded image included in the first plurality of encoded images is encoded at a different value for an encoding parameter.

9. The computer-implemented method of claim 1, wherein encoding a first source image included in the plurality of source images using the first encoding configuration comprises:
determining a first value for an encoding parameter based on the first source image, an encoder, and a search interval associated with an encoding parameter; and
causing the encoder to encode the first source image at the first value for the encoding parameter.

10. The computer-implemented method of claim 9, wherein encoding a second source image included in the plurality of source images using the first encoding configuration comprises:
determining a second value for the encoding parameter based on the second source image, the encoder, and the search interval; and
causing the encoder to encode the second source image at the second value for the encoding parameter.

11. One or more non-transitory computer readable media including instructions that, when executed by one or more processors, cause the one or more processors to analyze encoding configurations by performing the steps of:
generating a first plurality of encoded images based on a plurality of source images and a first encoding configuration, wherein each encoded image included in the first plurality of encoded images is associated with a different visual quality level that falls within a tolerance of a target visual quality level;
generating a second plurality of encoded images based on the plurality of source images and a second encoding configuration, wherein each encoded image included in the second plurality of encoded images is associated with a different visual quality level that falls within a tolerance of the target visual quality level;
computing a first total file size for the first plurality of encoded images and a second total file size for the second plurality of encoded images; and
computing a bitrate change based on the first total file size and the second total file size.

12. The one or more non-transitory computer readable media of claim 11, wherein the first encoding configuration specifies a first encoder and a first value for a first configuration parameter that is associated with the first encoder, and the second encoding configuration specifies a second encoder and a second value for a second configuration parameter that is associated with the second encoder.

13. The one or more non-transitory computer readable media of claim 11, wherein the first encoding configuration specifies a first encoder and a first value for a configuration parameter that is associated with the first encoder, the second encoding configuration specifies the first encoder and a second value for the first configuration parameter, and wherein the first value is not equal to the second value.

14. The one or more non-transitory computer readable media of claim 11, wherein the first encoding configuration specifies a first encoder that implements one of an AVIF, JPEG, JPEG 2000, WebP, or HEIC compression algorithm.

15. The one or more non-transitory computer readable media of claim 11, wherein the first encoding configuration specifies a first encoder and at least one of a profile level, an analysis level, a search level, a psycho-visual option, a performance option, or a tuning option.

16. The one or more non-transitory computer readable media of claim 11, wherein the first encoding configuration specifies a first codec, the second encoding configuration specifies a second codec, and the bitrate change quantifies a difference in compression efficiency when encoding images via the first codec relative to encoding the images via the second codec while maintaining the target visual quality score.

17. The one or more non-transitory computer readable media of claim 11, wherein the target visual quality level comprises a PSNR, a value for a VMAF metric, or a value for a BRISQUE metric.

18. The one or more non-transitory computer readable media of claim 11, wherein generating the first plurality of encoded images comprises:
determining a first value for an encoding parameter based on a first source image included in the plurality of source images, an encoder specified via the first encoding configuration, and a search interval associated with the encoding parameter; and
causing the encoder to encode the first source image at the first value for the encoding parameter to generate a first encoded image that is included in the first plurality of encoded images.

19. The one or more non-transitory computer readable media of claim 18, wherein generating the first plurality of encoded images further comprises:
determining a second value for the encoding parameter based on a second source image included in the plurality of source images, the encoder, and the search interval; and
causing the encoder to encode the second source image at the second value for the encoding parameter to generate a second encoded image that is included in the first plurality of encoded images.

20. A system, comprising:
one or more memories storing instructions; and
one or more processors that are coupled to the one or more memories and, when executing the instructions, are configured to:
generate a first plurality of encoded images based on a plurality of source images, a first encoding configuration, a first search interval associated with a first encoding parameter, and a target visual quality level;
generate a second plurality of encoded images based on the plurality of source images, a second encoding configuration, a second search interval associated with a second encoding parameter, and the target visual quality level;
compute a first total file size for the first plurality of encoded images and a second total file size for the second plurality of encoded images; and
compute a bitrate change based on the first total file size and the second total file size.

* * * * *